Oct. 21, 1952
G. E. BRANDT
2,615,061
BATTERY PLATE
Filed Feb. 3, 1948
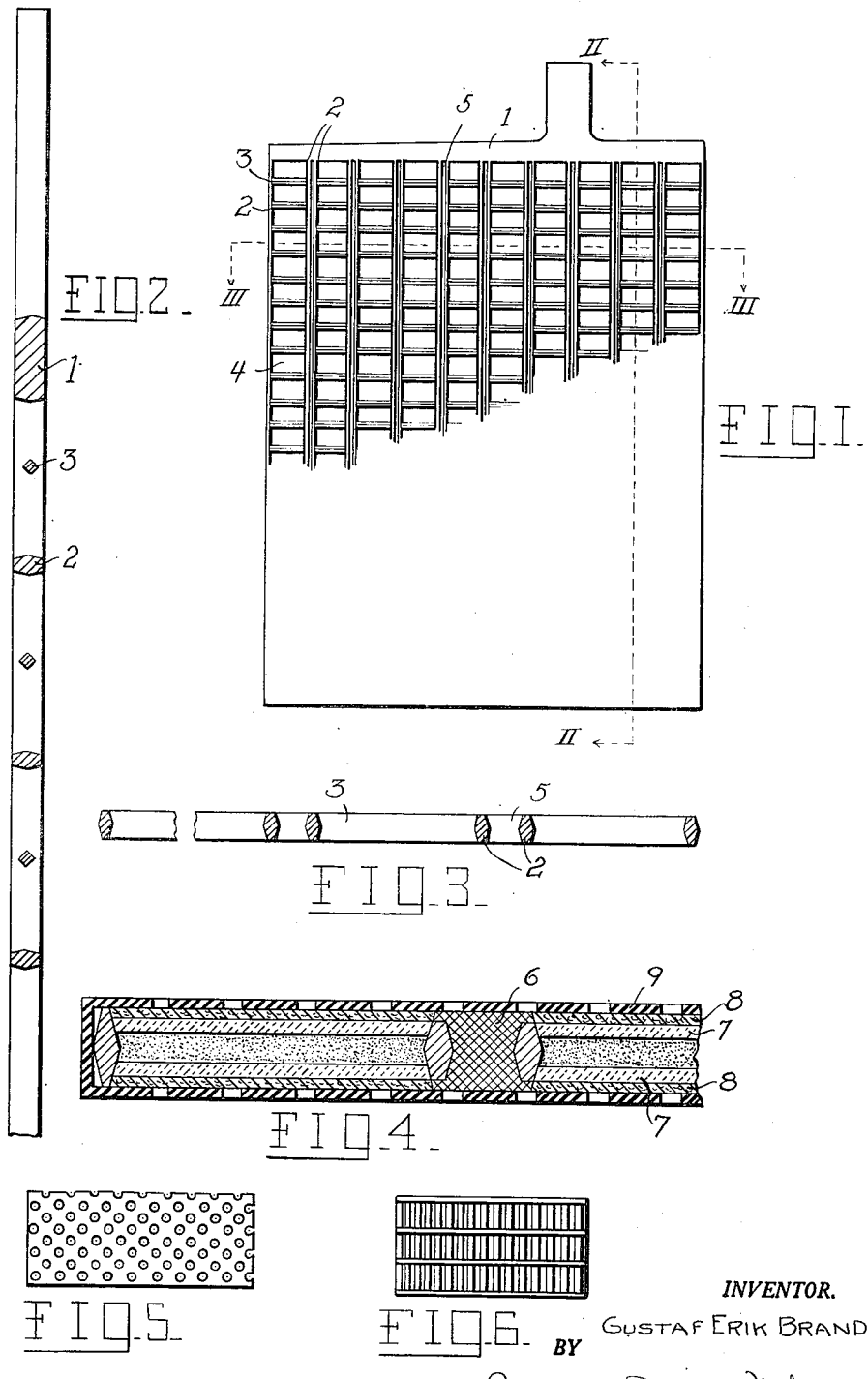
INVENTOR.
GUSTAF ERIK BRANDT
BY
Richardson, Davis and Nodin
his ATTYS.

Patented Oct. 21, 1952

2,615,061

UNITED STATES PATENT OFFICE 2,615,061

BATTERY PLATE

Gustaf Erik Brandt, Nol, Sweden, assignor to Aktiebolaget Tudor, Stockholm, Sweden, a Swedish joint-stock company Application February 3, 1948, Serial No. 5,964
In Sweden December 21, 1946

Section 1, Public Law 690, August 8, 1946
Patent expires December 21, 1966

3 Claims. (Cl. 136—36)

The demands on portable accumulators, particularly such as are intended for the operation of vehicles, are, inter alia, that they shall be easily operated, have a low weight, a long life, great mechanical strength, and a capacity as great as possible for a certain restricted space, and that the plates shall be properly insulated. The batteries of the lead and sulphuric acid type that have mostly been made use of hitherto for the purpose in view were batteries with positive and negative grid plates or with positive tube plates, so-called ironclad-plates and negative grid- or paste-plates.

The first-mentioned type of batteries with an active paste smeared into the grid of the plates is distinguished by a low weight and a small volume at a certain desired capacity and by low procuring costs, but the life of the plates is relatively short. The separation used to prevent the paste from finding its way out and to prevent short-circuits between the plates generally consists of wooden boards, porous rubber separators, perforated hard rubber leaves, polyvinyl chloride leaves or glass-wool separators, taken individually or in combinations.

On the other hand, the other of the above-named constructions, i. e. that with positive tube plates, consisting of a plurality of slotted hard rubber tubes united by two transverse bars, with a centrally disposed electric conductor in the respective tubes, about which conductor the active paste is pressed-in, has a longer life and greater mechanical strength, and the paste loss of the positive plates is less, whereas the plates are heavier, more bulky and more expensive.

The electrode according to the invention, which in a certain degree may be regarded as constituting a combination of the above-named grid and tube plates, not only combines in it the good properties of these plates, but also possesses further advantages.

The invention will be described more closely with reference to the accompanying drawing, wherein Fig. 1 is a view in elevation of an electrode frame with a partly illustrated grid therein. Fig. 2 is a vertical section on line II—II, and Fig. 3 is a horizontal section on line III—III in Fig. 1. Fig. 4 shows a horizontal section of the finished electrode with the insulation thereof, and Figs. 5 and 6 show portions of a perforated and of a slitted insulating casing of a mouldable type.

In the drawing, I designates an electrode frame with a grid therein. The grid is formed by the bars 2 and 3 of different profiles and of different cross sectional dimensions. These grid bars 2 and 3 form an integral row of squares. The grid bars 2 arranged in pairs at some distance from each other in the vertical direction of the plate divide the grid into longitudinally extending pockets 4. Arranged in each of the spaces 5 produced between the pairs of grid rods is a filler 6 from polyvinyl chloride or some other synthetic, acid-proof material, which has been given such a cross section by pressing in a mould, either before or after its arrangement in the grid, that it embraces the respective grid rod on three sides. These fillers impart to the grid rods, and consequently also to the plate in its entirety, a greater stability, and, furthermore, the surfaces of the grid rod facing the electrolyte are protected against disintegration by the fillers from synthetic resin bearing tightly thereon. The fillers 6 may also be made in a plurality of units, which are carried in any suitable manner, for instance by transversely extending connections between the sections. Such fillers may of course also be arranged at the grid ribs forming the frame of the plate, although this is not shown in the drawing. The pairs of grid rods or fillers may also be disposed in the horizontal direction of the plate or in some other direction. The meshes of the grid are filled with active paste 7, which is covered on both sides of the plate by an insulating material 8, preferably glass-wool. Finally, the plate is completely enclosed by an insulating perforated casing 9, which is welded to form an integral structure with the fillers 6 located between the sections, but the casing 9 may also be slitted, as shown in Fig. 6. Said casing is intended, inter alia, for keeping the glass-wool separators 8 in their proper position and for effectively counteracting, together with said separators, the tendency of the paste toward falling out from the grid, without the electrolyte being prevented from circulating. Furthermore, the casing 9 makes a perfect insulation for the lateral surfaces as well as for the edges of the plate. Said insulation of the edges of the plate prevents, inter alia, short-circuits between the plate in consideration and any of the adjacent plates and between the plate and any deposit of sludge on the bottom of the cell. In such cases where the frame of the plate does not participate in the electro-chemical process, but only serves as a conductor for the electric current, the part of the casing surrounding the frame can be made without perforations. The casing 9 is preferably made from polyvinyl chloride, which is distinguished by great durability and acid-proof properties, but it may also consist of some other comparable sheet material from synthetic resin.

A particularly advantageous embodiment of the casing according to the invention is obtained, if the lateral surfaces thereof are corrugated so that the wave crests bridge over the respective bridge sections, while the wave bottoms abut the respective fillers to be fixed to the latter. The lateral surfaces of the casing fixed in this manner and divided into a number of sections have a considerably greater resistance to pressure than if the lateral surfaces were in their entirety subjected to the compressive forces. In this embodiment, so much of active paste can be applied to the grid that the space between the latter and the casing is filled, entirely or in part, by the paste and the glass-wool insulation.

Among the advantages attained through the present invention, it might be pointed out in particular that the plate, together with the insulation in consideration, may be made as a unit of great strength and stability. The assembly of the cell, the repairs and the care of the same are facilitated. Glass-wool separators and polyvinyl chloride sheets need not be kept in stock. The casing not only keeps the glass-wool separators in their proper position and pressed against the paste, but also keeps the fibres at the edges thereof together so as to prevent loosening of the same.

The embodiments described have only been selected as examples for the elucidation of the invention, and the details of the same can be varied in various ways, without the principle of the invention being departed from.

What I claim is:

1. A battery plate, comprising an electrically conducting frame with an active paste inserted therein, said frame comprising electrically conducting grid bars embedded in said active paste and a number of parallel, electrically conducting main bars integral with said grid bars, said main bars being arranged in pairs and having lateral surfaces not covered by the active paste, the distance between said main bars forming a pair being short in relation to the distance between said main bars belonging to different pairs, fillers of insulating acid proof material inserted between the main bars of each pair and extending over the adjacent sides of each main bar in each pair thereby forming H-shaped strips in cross section and covering said lateral surfaces, said active paste being inserted between the adjacent bars of different pairs of main bars, a layer of insulating, liquid permeable material on each side of said frame to cover the lateral surfaces of said active paste, and a liquid permeable casing of insulating sheet material enclosing said layers of insulating, liquid permeable material, and being joined to said strips to form an integral structure therewith.

2. A battery plate comprising an electrically conducting frame with an active paste inserted therein, said frame comprising electrically conducting grid bars embedded in said active paste and a number of parallel, electrically conducting main bars integral with said grid bars, said main bars being arranged in pairs and having lateral surfaces not covered by the active paste, the distance between said main bars forming a pair being short in relation to the distance between said main bars belonging to different pairs, fillers of insulating, thermoplastic material inserted between the main bars of each pair and extending over the adjacent sides of each main bar in each pair thereby forming H-shaped strips in cross section and covering said lateral surfaces, said active paste inserted between the adjacent main bars of different pairs of main bars, a layer of insulating, liquid permeable material on each side of said frame to cover the lateral surfaces of said active paste, and a liquid permeable casing of insulating thermoplastic sheet material enclosing said layers of insulating, liquid permeable material and being welded to said strips to form an integral structure therewith.

3. A battery plate as claimed in claim 1, in which said casing is provided with corrugated side faces having crests and bottoms, said crests bridging said active paste and said bottoms being secured to said strips.

GUSTAF ERIK BRANDT.

REFERENCES CITED

The following references are of record in the file of this patent:

UNITED STATES PATENTS

| Number | Name | Date |
|---|---|---|
| 464,676 | Morrison | Dec. 8, 1891 |
| 605,695 | Brault | June 14, 1898 |
| 736,390 | Hatch | Aug. 18, 1903 |
| 902,975 | Lake | Nov. 3, 1908 |
| 1,607,225 | Williams | Nov. 16, 1926 |
| 2,084,964 | Smith | June 22, 1937 |
| 2,256,105 | Shank | Sept. 16, 1941 |
| 2,318,498 | Keen | May 4, 1943 |

FOREIGN PATENTS

| Number | Country | Date |
|---|---|---|
| 221,539 | Great Britain | Sept. 16, 1924 |